US012623561B2

(12) United States Patent
Makino et al.

(10) Patent No.: US 12,623,561 B2
(45) Date of Patent: May 12, 2026

(54) POWER SUPPLY SYSTEM FOR VEHICLE AND CONTROL METHOD

(71) Applicant: HONDA MOTOR CO., LTD., Tokyo (JP)

(72) Inventors: Tatsunori Makino, Tokyo (JP); Natsuki Ehara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 18/444,788

(22) Filed: Feb. 19, 2024

(65) Prior Publication Data

US 2024/0326623 A1    Oct. 3, 2024

(30) Foreign Application Priority Data

Mar. 31, 2023    (CN) .......................... 202310336311.4

(51) Int. Cl.
*B60L 53/20* (2019.01)
*B60L 58/10* (2019.01)

(52) U.S. Cl.
CPC ............... *B60L 53/20* (2019.02); *B60L 58/10* (2019.02); *B60L 2210/10* (2013.01)

(58) Field of Classification Search
CPC ....... B60L 53/20; B60L 58/10; B60L 2210/10
See application file for complete search history.

(56) References Cited

U.S. PATENT DOCUMENTS

| | | | | |
|---|---|---|---|---|
| 8,534,400 | B2 * | 9/2013 | Stanek | B60L 53/14 |
| | | | | 307/64 |
| 8,981,727 | B2 * | 3/2015 | Kusch | B60L 53/00 |
| | | | | 320/167 |
| 10,000,137 | B2 * | 6/2018 | Masuda | B60L 58/12 |
| 10,457,155 | B2 * | 10/2019 | Wu | B60L 58/22 |
| 2021/0291688 | A1 * | 9/2021 | Hirose | B60L 50/50 |
| 2022/0388419 | A1 * | 12/2022 | Doi | B60L 53/16 |

FOREIGN PATENT DOCUMENTS

| | | | |
|---|---|---|---|
| JP | 2021151030 A | 9/2021 | |
| KR | 20140079626 * | 6/2014 | B60L 50/64 |

* cited by examiner

*Primary Examiner* — Christian Chace
*Assistant Examiner* — Minato Lee Horner
(74) *Attorney, Agent, or Firm* — CKC & Partners Co., LLC

(57) ABSTRACT

A power supply system includes a charging controller, in which, when a soak time representing a period of time elapsed after an off operation has been received is shorter than a first period of time that is determined beforehand, a coupling state detector has detected that there is coupling between an external power supply and an on-vehicle charger, and a remaining amount in a low voltage battery is equal to or below a predetermined remaining amount, the charging controller causes the low voltage battery to be charged with electricity.

7 Claims, 5 Drawing Sheets

Figure 5:
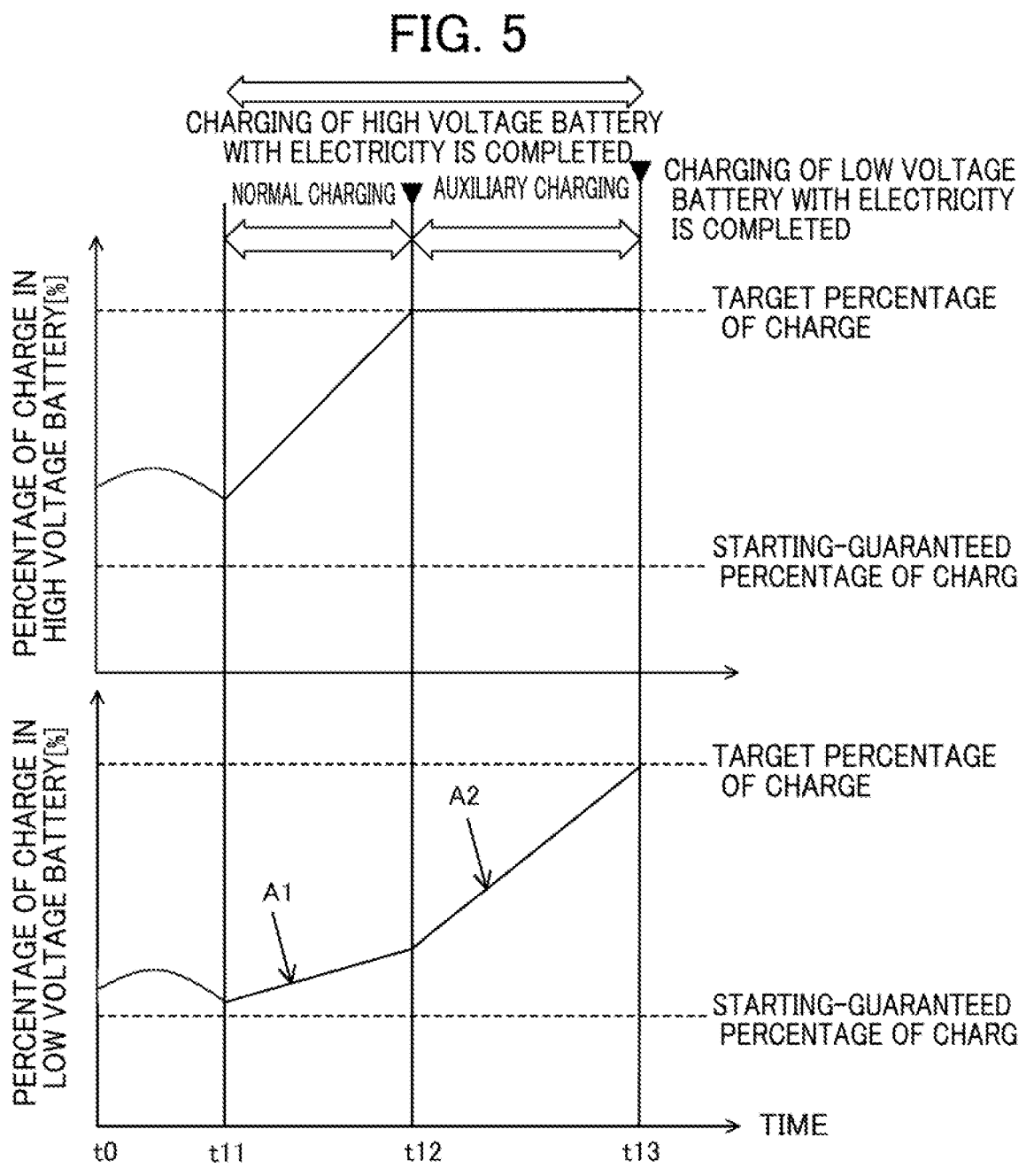

CHARGING OF HIGH VOLTAGE BATTERY
WITH ELECTRICITY IS COMPLETED

CHARGING OF LOW VOLTAGE
BATTERY WITH ELECTRICITY
IS COMPLETED

NORMAL CHARGING ▼ AUXILIARY CHARGING ▼

PERCENTAGE OF CHARGE IN
HIGH VOLTAGE BATTERY[%]

TARGET PERCENTAGE
OF CHARGE

STARTING-GUARANTEED
PERCENTAGE OF CHARG

PERCENTAGE OF CHARGE IN
LOW VOLTAGE BATTERY[%]

TARGET PERCENTAGE
OF CHARGE

A2

A1

STARTING-GUARANTEED
PERCENTAGE OF CHARG

TIME t0     t11     t12     t13

POWER SUPPLY SYSTEM FOR VEHICLE AND CONTROL METHOD

This application is based on and claims the benefit of priority from Chinese Patent Application No. 202310336311.4, filed on 31 Mar. 2023, the content of which is incorporated herein by reference.

BACKGROUND OF THE INVENTION

Field of the Invention

The present invention relates to a power supply system for a vehicle and a control method for the power supply system.

Related Art

In recent years, research and development have been conducted on secondary batteries that contribute to energy efficiency in order to ensure that more people have access to affordable, reliable, sustainable, and advanced energy.

A power supply system mounted on an electric vehicle or a hybrid electric vehicle includes a high voltage battery storing electric power to be mainly supplied to a drive motor for traveling and a low voltage battery storing electric power to be mainly supplied to auxiliary devices at a voltage lower than a voltage at which the high voltage battery supplies electric power. For example, Patent Document 1 illustrates a power supply system for an electric vehicle, in which a high voltage circuit provided with a high voltage battery and a low voltage circuit provided with a low voltage battery are coupled to each other via a voltage converter. When charged electricity in the low voltage battery becomes insufficient in the power supply system illustrated in Patent Document 1, the voltage converter lowers a voltage of electric power that the high voltage battery supplies to charge the low voltage battery with electricity. Charging a low voltage battery using power supplied by a high voltage battery will also be hereinafter referred to as auxiliary charging.

Patent Document 1: Japanese Unexamined Patent Application, Publication No. 2021-151030

SUMMARY OF THE INVENTION

Conventionally, there has been no auxiliary charging performed from a high voltage battery to a low voltage battery, regardless of a remaining amount in the low voltage battery, within a certain period of time after an off operation has been performed by a user for stopping a vehicle, from a viewpoint of maintainability for the vehicle in techniques regarding secondary batteries. Therefore, there has been a possibility that, within the certain period of time, the remaining amount in the low voltage battery lowers, making it impossible to start the vehicle.

In view of solving the issues described above, an object of the present application is to achieve a power supply system for a vehicle and a control method for the power supply system that make it possible to securely start the vehicle even in a state where there is a higher possibility that a user does not perform preventive and predictive maintenance on the vehicle. This in turn contributes to energy efficiency.

A power supply system for a vehicle, according to an aspect of the present disclosure includes: a low voltage circuit provided with a low voltage electric storage; a high voltage circuit provided with a high voltage electric storage that is higher in voltage than the low voltage electric storage;

a charging circuit that couples the low voltage circuit and the high voltage circuit to each other; an on-vehicle charger that supplies, when coupled to an external power supply, direct current electric power to at least either of the high voltage circuit or the low voltage circuit; a coupling state detector that is able to detect that there is coupling between the external power supply and the on-vehicle charger; an operation receiver that receives an on operation or an off operation performed by a user for starting or stopping the vehicle; and a charging controller that causes the charging circuit to operate to execute auxiliary charging control for charging the low voltage electric storage with electricity, in which, when a soak time representing a period of time elapsed after the off operation has been received is shorter than a first period of time that is determined beforehand, the coupling state detector has detected that there is coupling between the external power supply and the on-vehicle charger, and a remaining amount in the low voltage electric storage is equal to or below a predetermined remaining amount, the charging controller causes the low voltage electric storage to be charged with electricity.

Furthermore, the coupling state detector detects, based on mechanical coupling between a coupling terminal of the external power supply and the on-vehicle charger or based on an operation state at the coupling terminal of the external power supply, whether or not there is coupling between the external power supply and the on-vehicle charger.

Furthermore, when the soak time is shorter than the first period of time, and the coupling state detector has detected that there is coupling between the external power supply and the on-vehicle charger, the charging controller causes the low voltage electric storage to be charged with electricity in such a manner that a charging speed for the low voltage electric storage is faster than a charging speed when the external power supply is not coupled to the on-vehicle charger.

Furthermore, when the soak time is shorter than the first period of time, the charging controller uses an amount of electric power equal to or below a value acquired by subtracting an amount of electric power for charging the high voltage electric storage with electricity from an amount of electric power supplied from the external power supply to charge the low voltage electric storage with electricity.

Furthermore, when the soak time is shorter than the first period of time, and the high voltage electric storage is undergoing charging with electricity, the charging controller does not cause the low voltage electric storage to be charged with electricity.

Furthermore, when the soak time is shorter than the first period of time, the low voltage electric storage is undergoing charging with electricity, and the coupling state detector detects that there is release of the coupling between the external power supply and the on-vehicle charger, the charging controller stops charging of the low voltage electric storage with electricity.

Furthermore, after charging of the high voltage electric storage with electricity is completed, the charging controller causes the on-vehicle charger to directly charge the low voltage electric storage with electricity.

Furthermore, after charging of the high voltage electric storage with electricity is completed, and the coupling state detector has detected that there is coupling between the external power supply and the on-vehicle charger, the charging controller causes the low voltage electric storage to be charged with electricity at a voltage higher than a charging voltage when the high voltage electric storage undergoes charging with electricity.

A control method performed in a power supply system for a vehicle, according to an aspect of the present disclosure, includes causing, when a soak time representing a period of time elapsed after an off operation performed by a user for stopping the vehicle has been received is shorter than a first period of time that is determined beforehand, a coupling state detector in the power supply system has detected that there is coupling between an external power supply and an on-vehicle charger, and a remaining amount in a low voltage electric storage is equal to or below a predetermined remaining amount, a charging controller in the power supply system to charge the low voltage electric storage with electricity.

According to the present invention, it is possible to provide a power supply system for a vehicle and a control method for the power supply system that make it possible to securely start the vehicle even in a state where there is a higher possibility that a user does not perform preventive and predictive maintenance on the vehicle.

BRIEF DESCRIPTION OF THE DRAWINGS

FIG. 1 is a view illustrating a configuration of a vehicle mounted with a power supply system according to the present embodiment;

FIG. 5 is a view illustrating timings for charging the high voltage battery and the low voltage battery with electricity.

DETAILED DESCRIPTION OF THE INVENTION

Figure 1:
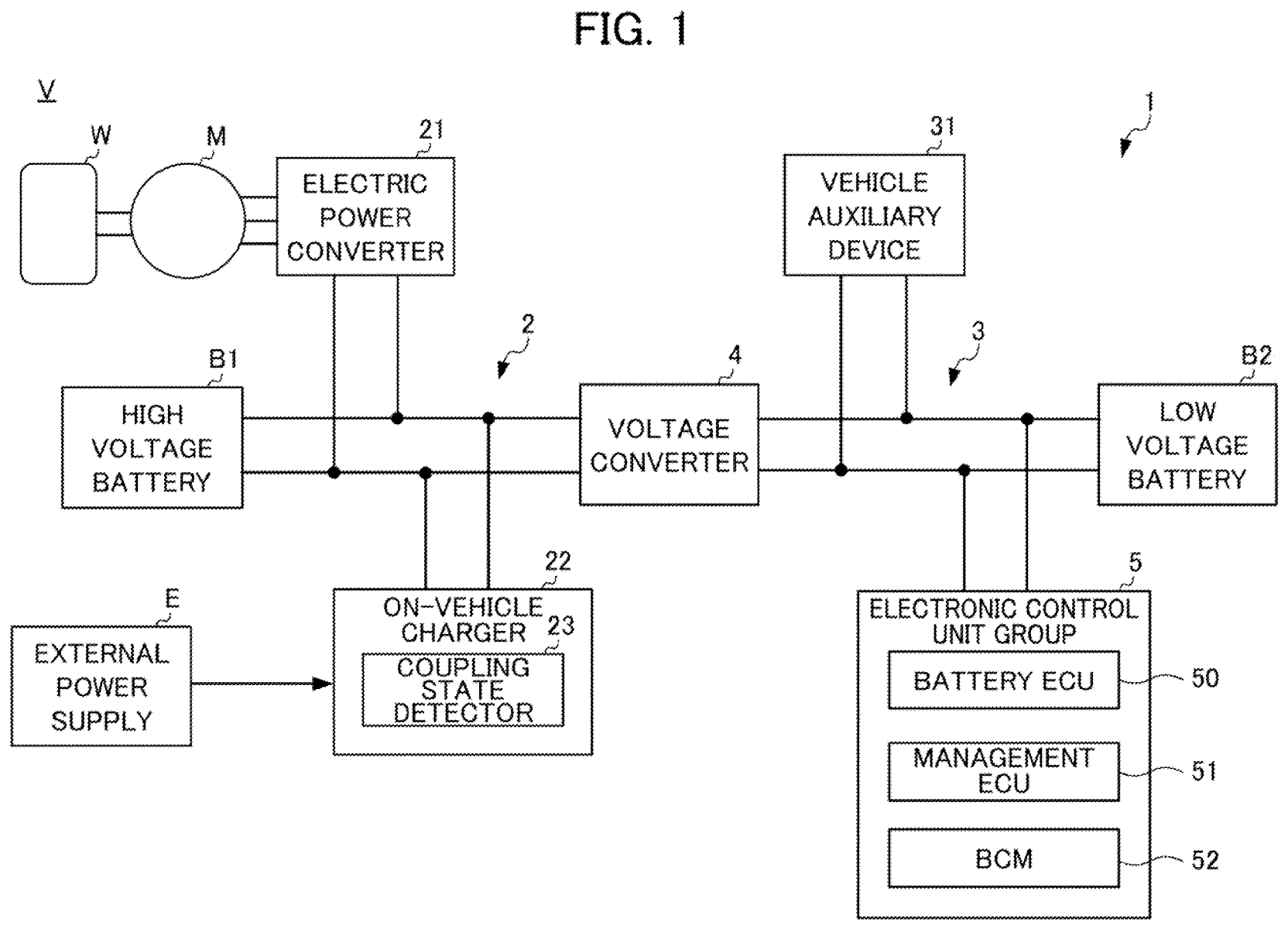
Figure 2:
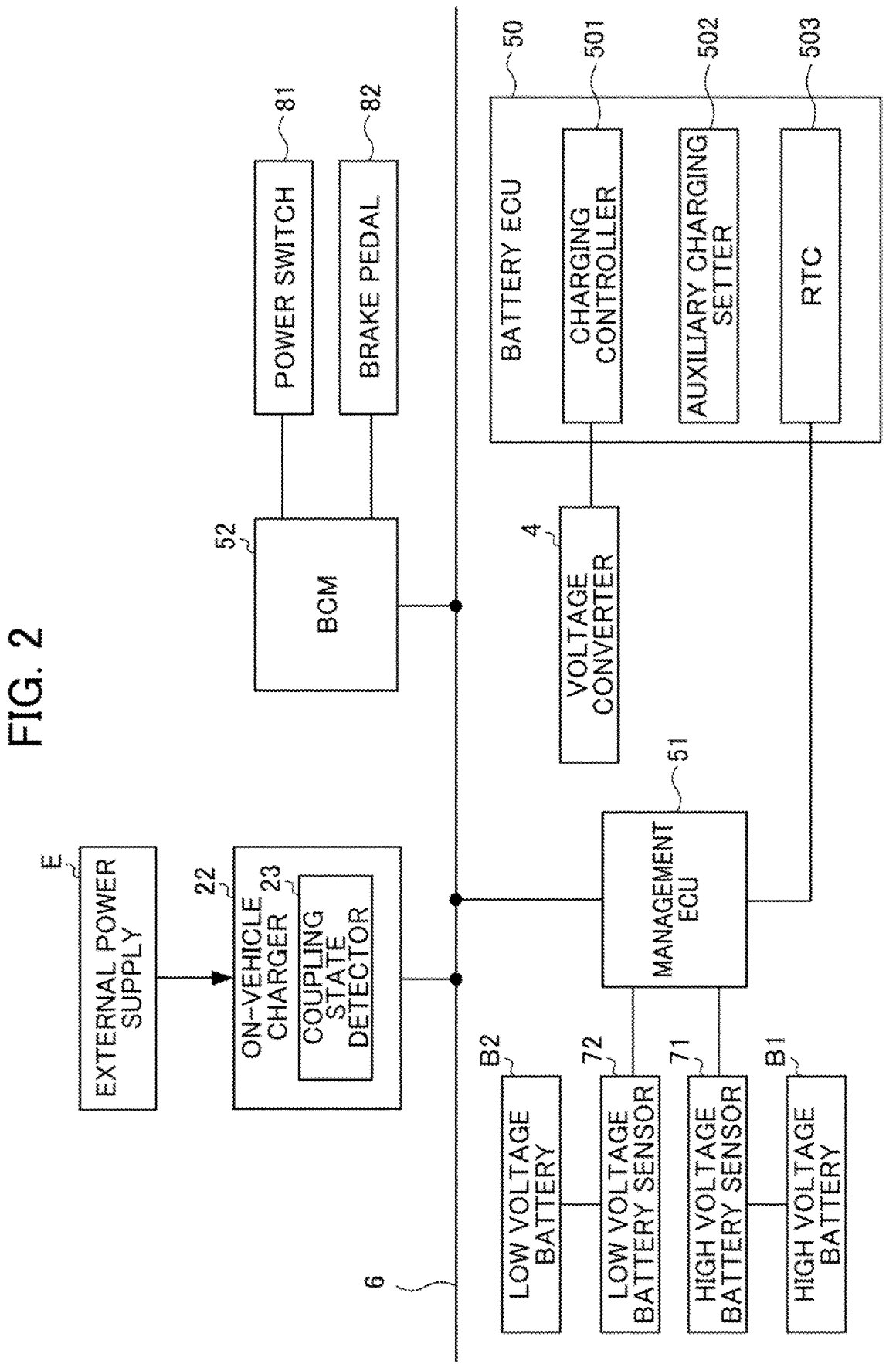
FIG. 2 is a view illustrating a configuration of an electronic control unit group.

An embodiment of the present invention will now be described herein with reference to the accompanying drawings. FIG. 1 is a view illustrating a configuration of a vehicle V mounted with a power supply system 1 according to the present embodiment.

The vehicle V includes drive wheels W, a drive motor M coupled to the drive wheels W, and the power supply system 1 that allows electrical power to be provided to and received from a high voltage battery B1 described later. Note that, although the present embodiment describes a case where the vehicle V is an electric vehicle that mainly uses a driving force generated in the drive motor M for acceleration and deceleration, the present invention is not limited to this case. The vehicle V may be a so-called hybrid electric vehicle mounted with a drive motor M and an engine as driving force generation sources.

The drive motor M is coupled to the drive wheels W via a non-illustrated driving force transmission mechanism. As the power supply system 1 supplies three phase, alternating current electric power to the drive motor M, the drive motor M generates torque, which is transmitted, via the non-illustrated driving force transmission mechanism, to the drive wheels W to rotate the drive wheels W and to allow the vehicle V to run. Furthermore, the drive motor M exerts a function of a generator when the vehicle V decelerates to generate regenerative electric power, and to apply regenerative braking torque corresponding to a magnitude of the regenerative electric power to the drive wheels W. The regenerative electric power that the drive motor M has generated is appropriately used to charge the high voltage battery B1 and a low voltage battery B2 in the power supply system 1 with electricity.

The power supply system 1 includes a high voltage circuit 2 provided with the high voltage battery B1, a low voltage circuit 3 provided with the low voltage battery B2, a voltage converter 4 that couples the high voltage circuit 2 and the low voltage circuit 3 to each other, and an electronic control unit group 5 that controls the high voltage circuit 2, the low voltage circuit 3, and the voltage converter 4.

The high voltage battery B1 is a secondary battery for which it is possible to perform both discharging where chemical energy is converted into electric energy and charging where electric energy is converted into chemical energy. Although a case will be described below, where a so-called lithium ion storage battery is used as the high voltage battery B1, in which lithium ions move between electrodes to perform charging and discharging, the present invention is not limited to the case.

The low voltage battery B2 is a secondary battery for which it is possible to perform both discharging where chemical energy is converted into electric energy and charging where electric energy is converted into chemical energy. Although a case will be described below, where the low voltage battery B2 is a so-called lead acid storage battery using lead dioxide for a positive electrode, lead having a spongy structure for a negative electrode, and dilute sulfuric acid as an electrolytic solution, the present invention is not limited to this case. Furthermore, a voltage in the low voltage battery B2 is lower than a voltage in the high voltage battery B1. Therefore, a voltage in the high voltage circuit 2 is higher than a voltage in the low voltage circuit 3.

The voltage converter 4 couples the high voltage circuit 2 and the low voltage circuit 3 to each other. The voltage converter 4 is, for example, a direct current-direct current (DC-DC) converter in which switching elements, reactors, and smoothing capacitors are combined with each other, and has a function of converting a voltage between the high voltage circuit 2 and the low voltage circuit 3. The voltage converter 4 follows gate drive signals generated at predetermined timings from a non-illustrated gate drive circuit based on commands from the electronic control unit group 5, on-and-off drives the switching elements, lowers a voltage of electric power in the high voltage circuit 2, and supplies the electric power at the lowered voltage to the low voltage circuit 3.

The high voltage circuit 2 is coupled with an electric power converter 21 and an on-vehicle charger 22.

The electric power converter 21 converts electric power between the high voltage circuit 2 and the drive motor M. The electric power converter 21 is a pulse width modulation (PWM) inverter that operates based on pulse width modulation, for example, and has a function of performing conversion between direct current electric power and alternating current electric power. The electric power converter 21 is coupled to the high voltage circuit 2 on its direct current, input-and-output side and is coupled to coils of a U phase, a V phase, and a W phase in the drive motor M on its alternating current, input-and-output side. The electric power converter 21 follows gate drive signals generated at predetermined timings from the non-illustrated gate drive circuit based on commands from the electronic control unit group 5, on-and-off drives the switching elements, converts direct current electric power in the high voltage circuit 2 into three-phase alternating current electric power, supplies the converted three-phase alternating current electric power to the drive motor M, converts three-phase alternating current electric power supplied from the drive motor M into direct current electric power, and supplies the converted direct current electric power to the high voltage circuit 2.

When coupled to an external power supply E such as a home-use commercial alternating current power supply or a quick-charging alternating current power supply, for example, the on-vehicle charger 22 converts alternating current electric power supplied from the external power supply E into direct current electric power, supplies the converted direct current electric power to the high voltage circuit 2, and causes the high voltage battery B1 to be charged with electricity. Furthermore, at this time, it is possible to drive the voltage converter 4 to lower a voltage of electric power in the high voltage circuit 2, to supply the electric power at the lowered voltage to the low voltage circuit 3, and to cause the low voltage battery B2 to be charged with electricity. Charging of the high voltage battery B1 with electricity via the on-vehicle charger 22 will be hereinafter referred to as external charging.

A coupling state detector 23 is a device that is able to detect that there is coupling between the external power supply E and the on-vehicle charger 22, and includes a mechanical switch, a sensor, and a circuit, for example.

The coupling state detector 23 may detect, based on mechanical coupling between a coupling terminal (for example, a charging gun or a connector of a charger) of the external power supply E and the on-vehicle charger 22, whether or not there is coupling between the external power supply E and the on-vehicle charger 22. The coupling state detector 23 includes a mechanical switch, for example, and, when the coupling terminal of the external power supply E and the on-vehicle charger 22 are mechanically coupled to each other, which causes the switch to be turned on, the coupling state detector 23 detects that there is coupling between the external power supply E and the on-vehicle charger 22. On the other hand, when the coupling terminal of the external power supply E and the on-vehicle charger 22 are not mechanically coupled to each other, which causes the switch to be turned off, the coupling state detector 23 detects that the external power supply E and the on-vehicle charger 22 are not coupled to each other.

Furthermore, the coupling state detector 23 may detect whether or not there is coupling between the external power supply E and the on-vehicle charger 22 based on an operation state at the coupling terminal (for example, a charging gun or a connector of a charger) of the external power supply E. For example, the coupling state detector 23 includes a sensor or a circuit that is able to acquire an operation state at the coupling terminal (for example, a charging gun or a connector of a charger), and, based on an acquired operation state at the coupling terminal of the external power supply E, determines that the coupling terminal of the external power supply E is operating normally to detect that there is coupling between the external power supply E and the on-vehicle charger 22. On the other hand, based on an acquired operation state at the coupling terminal of the external power supply E, the coupling state detector 23, determines that the coupling terminal of the external power supply E is not operating normally to detect that the external power supply E and the on-vehicle charger 22 are not coupled to each other.

Then, when whether or not there is coupling between the external power supply E and the on-vehicle charger 22 is detected, the coupling state detector 23 transmits a signal indicating whether or not there is coupling to a battery electronic control unit (ECU) 50.

The low voltage circuit 3 is coupled with a vehicle auxiliary device 31 and the electronic control unit group 5. The vehicle auxiliary device 31 and the electronic control unit group 5 consume electric power in the low voltage circuit 3 to operate. The vehicle auxiliary device 31 includes a plurality of electric and electronic components such as lamps, a car navigation system, an audio device, and an air compressor.

FIG. 2 is a view illustrating a configuration of the electronic control unit group 5. The electronic control unit group 5 includes the battery ECU 50, a management ECU 51, and a body control module (BCM) 52. The battery ECU 50, the management ECU 51, and the BCM 52 are coupled to each other via a controller area network bus (CAN bus) 6 that is a bus-type network for sending and receiving various types of control information, allowing the components to send and receive necessary control information.

The management ECU 51 is a microcomputer that mainly takes a role of performing control regarding monitoring of states of the high voltage battery B1 and the low voltage battery B2. The management ECU 51 is coupled with a high voltage battery sensor 71 and a low voltage battery sensor 72.

The high voltage battery sensor 71 detects a physical quantity necessary for allowing the management ECU 51 to estimate a percentage of charge (an amount of stored electric power in a battery is represented by percentage) in the high voltage battery B1, and transmits signals corresponding to detection values to the management ECU 51. More specifically, the high voltage battery sensor 71 includes a voltage sensor that detects a terminal voltage of the high voltage battery B1, an electric current sensor that detects an electric current flowing in the high voltage battery B1, and a temperature sensor that detects a temperature in the high voltage battery B1, for example. The management ECU 51 follows a known algorithm to calculate, based on signals transmitted from the high voltage battery sensor 71, a percentage of charge in the high voltage battery B1.

The low voltage battery sensor 72 detects a physical quantity necessary for allowing the management ECU 51 to estimate a percentage of charge (an amount of stored electric power in a battery is represented by percentage) in the low voltage battery B2, and transmits signals corresponding to detection values to the management ECU 51. More specifically, the low voltage battery sensor 72 includes a voltage sensor that detects a terminal voltage of the low voltage battery B2, an electric current sensor that detects an electric current flowing in the low voltage battery B2, and a temperature sensor that detects a temperature in the low voltage battery B2, for example. The management ECU 51 follows a known algorithm to calculate, based on signals transmitted from the low voltage battery sensor 72, a percentage of charge in the low voltage battery B2.

The BCM 52 is a microcomputer that takes a role of performing control regarding reception of starting-and-stopping operations for the vehicle V, a door locking operation for the vehicle V, and an entry operation for the vehicle V, for example. The BCM 52 is coupled with a power switch 81 and a brake pedal 82 that a user is able to operate, for example.

The BCM 52 receives, based on signals transmitted from the power switch 81 and the brake pedal 82, an on operation or an off operation performed by the user for starting or stopping the vehicle V. The user is able to operate the power switch 81 and the brake pedal 82 in a combined manner to perform three types of operations that are a first on operation, a second on operation, and an off operation.

The first on operation refers to an operation of depressing the brake pedal 82 and pressing the power switch 81, which are performed simultaneously by the user to start the vehicle V under a travel mode. Upon reception of a first on operation performed by the user, the BCM 52 starts the vehicle V under the travel mode to put the vehicle V in a traveling-possible state. The second on operation refers to an operation of pressing the power switch 81 without depressing the brake pedal 82, which is performed by the user to start the vehicle V under an accessory mode. Upon reception of a second on operation performed by the user, the BCM 52 starts the vehicle V under the accessory mode to put the vehicle auxiliary device 31 in a ready state. The off operation refers to an operation of pressing the power switch 81, which is performed by the user to stop the vehicle V. Upon reception of an off operation performed by the user, the BCM 52 stops the vehicle V.

The battery ECU 50 is a microcomputer that mainly takes a role of performing charging control for the low voltage battery B2. The battery ECU 50 includes a charging controller 501, an auxiliary charging setter 502, and a real time clock (RTC) 503.

The charging controller 501 causes the voltage converter 4 to operate to execute charging control for charging the low voltage battery B2 with electricity using electric power in the high voltage circuit 2. The charging controller 501 is able to selectively execute, as such charging control for the low voltage battery B2, normal charging control of causing, while the vehicle V is traveling, the voltage converter 4 to operate to lower a voltage of electric power in the high voltage circuit 2, to supply the electric power at the lowered voltage to the low voltage circuit 3, and to charge the low voltage battery B2 with electricity and auxiliary charging control of causing, while the vehicle V has stopped, the voltage converter 4 to operate to lower a voltage of electric power in the high voltage circuit 2, to supply the electric power at the lowered voltage to the low voltage circuit 3, and to charge the low voltage battery B2 with electricity.

While the vehicle V is traveling, the high voltage circuit 2 is supplied with electric power outputted from the high voltage battery B1 and regenerative electric power outputted from the electric power converter 21. Therefore, it is possible to use electric power in the high voltage battery B1 and regenerative electric power to charge the low voltage battery B2 with electricity under the normal charging control. While the vehicle V is started under the travel mode, the charging controller 501 appropriately executes the normal charging control to keep a percentage of charge in the low voltage battery B2 to a predetermined target percentage of charge.

On the other hand, while the vehicle V has stopped, and the on-vehicle charger 22 has not yet executed external charging, the high voltage circuit 2 is only supplied with electric power outputted from the high voltage battery B1. Therefore, it is possible to use electric power in the high voltage battery B1 to charge the low voltage battery B2 with electricity under the auxiliary charging control.

Figure 3:
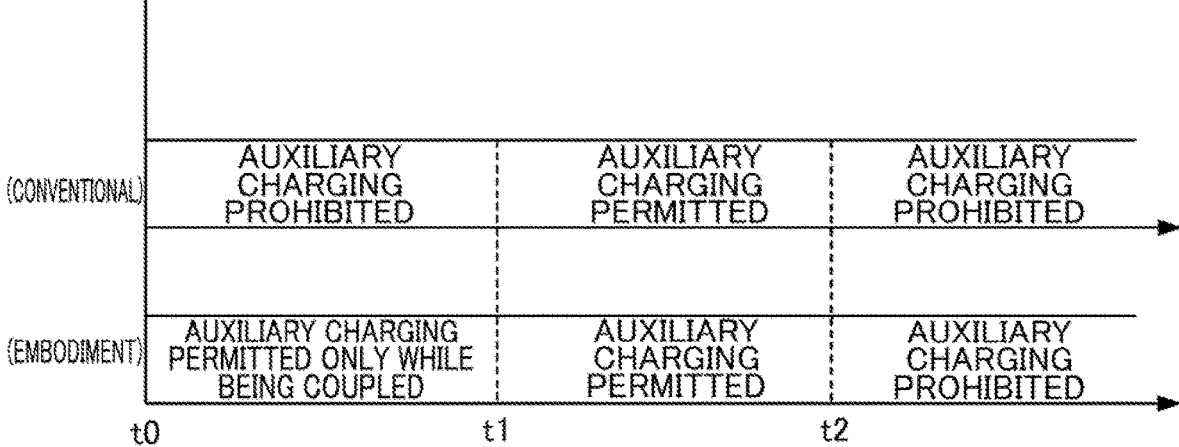
FIG. 3 is a view illustrating a period of time within which it is possible to perform auxiliary charging for a low voltage battery while the vehicle has stopped.

FIG. 3 is a view illustrating a period of time within which it is possible to perform auxiliary charging for the low voltage battery B2 while the vehicle V has stopped. FIG. 3 illustrates a case where the user has performed an off operation at time t0.

Since a dark current flows on a regular basis in the low voltage battery B2 while the vehicle V has stopped, a percentage of charge in the low voltage battery B2 gradually lowers. Therefore, if the vehicle V has stopped for a long period of time, a percentage of charge in the low voltage battery B2 may lower below a predetermined, starting-guaranteed percentage of charge, making it impossible to start the vehicle V.

Therefore, the charging controller 501 executes, while the vehicle V has stopped, the auxiliary charging control at a charging timing (in FIG. 3, within a period of time from time t1 to time t2) that the auxiliary charging setter 502 sets to use electric power in the high voltage battery B1 to charge the low voltage battery B2 with electricity.

Furthermore, the auxiliary charging setter 502 executes auxiliary charging timing setting processing to set an execution time (more specifically, a date and time of execution) for the auxiliary charging control within a period of time while the vehicle V has stopped until the BCM 52 receives a first on operation after an off operation has been received. The auxiliary charging setter 502 executes the auxiliary charging timing setting processing as the BCM 52 receives an off operation, and executes second auxiliary charging timing setting processing as the charging controller 501 has ended the auxiliary charging control.

When an auxiliary charging timing set by the auxiliary charging setter 502 is reached within a period of time while the vehicle V has stopped, the RTC 503 illustrated in FIG. 2 starts the charging controller 501, the auxiliary charging setter 502, and the management ECU 51.

Furthermore, conventionally, an auxiliary charging setter 502 sets a period of time where auxiliary charging control is prohibited when a soak time representing a period of time elapsed after a BCM 52 has received an off operation falls within a first period of time that is determined beforehand (a period of time from the time t0 the time t1 in FIG. 3).

When a soak time representing a period of time elapsed after an off operation has been received is shorter than a first period of time that is determined beforehand, the coupling state detector 23 has detected that there is coupling between the external power supply E and the on-vehicle charger 22, and a remaining amount in the low voltage battery B2 is equal to or below a predetermined remaining amount, the charging controller 501 according to the present embodiment causes the low voltage battery B2 to be charged with electricity. Note herein that charging of the low voltage battery B2 with electricity may be performed using electric power in the high voltage circuit 2 (electric power supplied from the high voltage battery B1) or electric power in the low voltage circuit 3 (electric power supplied from the on-vehicle charger 22).

Furthermore, when a soak time is shorter than the first period of time, and the coupling state detector 23 has detected that there is coupling between the external power supply E and the on-vehicle charger 22, the charging controller 501 causes the low voltage battery B2 to be charged with electricity in such a manner that a charging speed for the low voltage battery B2 is faster than a charging speed when the external power supply E is not coupled to the on-vehicle charger 22. Furthermore, instead of the charging speed described above, the charging controller 501 may cause the low voltage battery B2 to be charged with electricity in such a manner that a charging voltage for the low voltage battery B2 is higher than a charging voltage when the external power supply E is not coupled to the on-vehicle charger 22.

Furthermore, when a soak time is shorter than the first period of time, and the high voltage battery B1 is undergoing charging with electricity, the charging controller 501 does not cause the low voltage battery B2 to be charged with electricity.

Furthermore, when a soak time is shorter than the first period of time, the low voltage battery B2 is undergoing charging with electricity, and the coupling state detector 23 detects that there is release of the coupling between the external power supply E and the on-vehicle charger 22, the charging controller 501 stops charging of the low voltage battery B2 with electricity.

Figure 4:
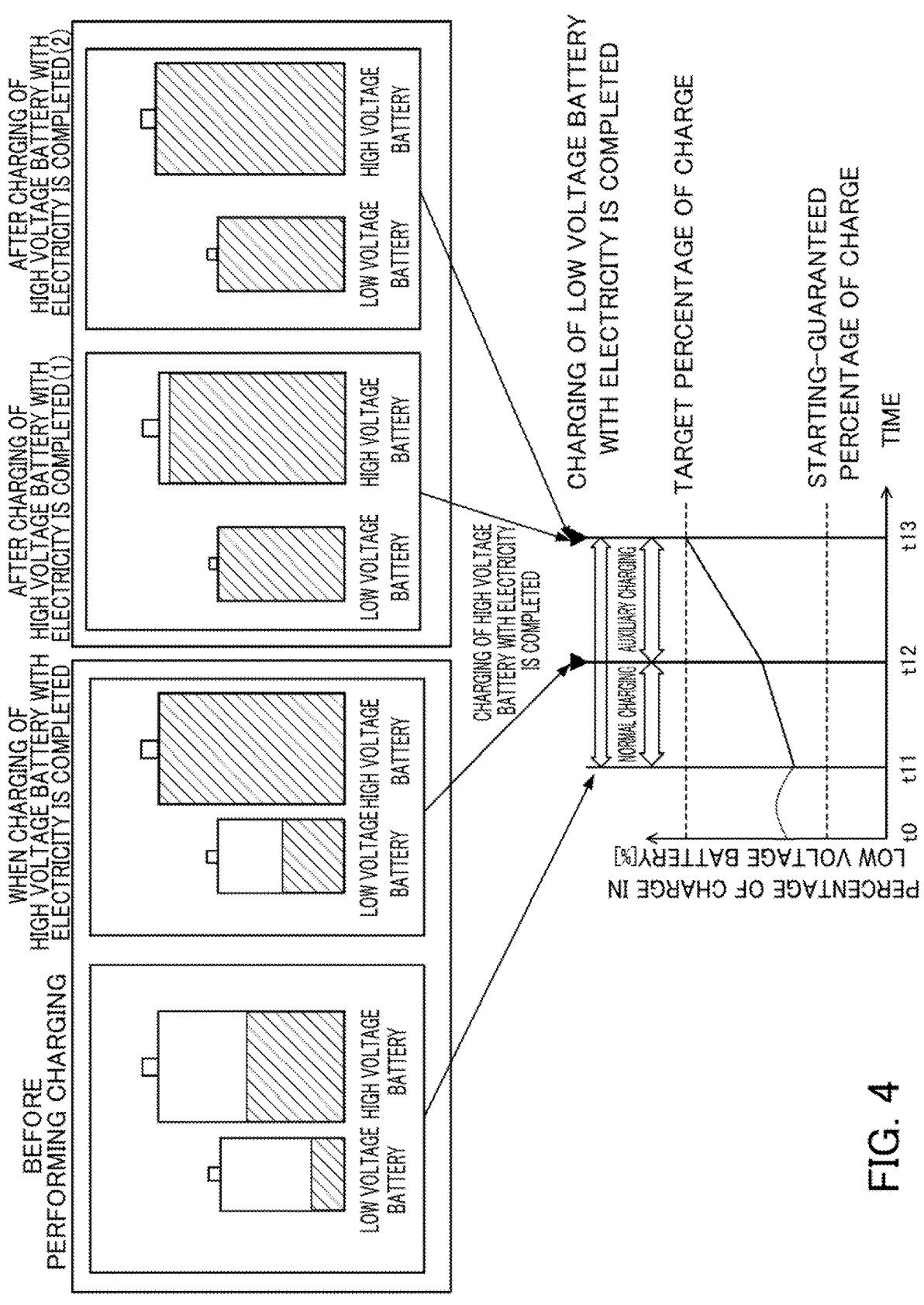
FIG. 4 is a view illustrating charging of a high voltage battery and the low voltage battery with electricity while the vehicle has stopped.

FIG. 4 is a view illustrating charging of the high voltage battery B1 and the low voltage battery B2 with electricity while the vehicle V has stopped. In FIG. 4, a vertical axis illustrates a percentage of charge in the low voltage battery B2 (a state of charge (SOC)), and a horizontal axis illustrates time.

At time t0, the BCM 52 has received an off operation, and, at time t11, the high voltage battery B1 and the low voltage battery B2 are both not fully charged with electricity. Furthermore, at the time t11 and time t12, a soak time is shorter than the first period of time, the coupling state detector 23 has detected that there is coupling between the external power supply E and the on-vehicle charger 22, and a remaining amount in the low voltage battery B2 (a percentage of charge) is equal to or below the predetermined remaining amount (a percentage of charge).

At the time t11, the coupling state detector 23 detects that there is coupling between the external power supply E and the on-vehicle charger 22, and charging of the high voltage battery B1 with electricity is performed (normal charging). While charging of the high voltage battery B1 with electricity is performed, electric power in the high voltage battery B1 is used to charge the low voltage battery B2 with electricity.

At the time t12, charging of the high voltage battery B1 with electricity is completed. Since the low voltage battery B2 is not fully charged with electricity at this time, auxiliary charging is executed. Conventionally, after charging of a high voltage battery B1 with electricity is completed, a charging controller 501 consumes electric power in the high voltage battery B1 to execute auxiliary charging for a low voltage battery B2.

In the present embodiment, the charging controller 501 causes the on-vehicle charger 22 coupled to the external power supply E to directly charge the low voltage battery B2 with electricity after charging of the high voltage battery B1 with electricity is completed, making it possible to execute auxiliary charging for the low voltage battery B2 without consuming electric power in the high voltage battery B1.

FIG. 5 is a view illustrating timings for charging the high voltage battery B1 and the low voltage battery B2 with electricity. At time t11 and time t12 in FIG. 5, similar to FIG. 4, a soak time is shorter than the first period of time, and the coupling state detector 23 has detected that there is coupling between the external power supply E and the on-vehicle charger 22.

While the high voltage battery B1 is undergoing charging with electricity, as indicated by A1 illustrated in FIG. 5, charging of the high voltage battery B1 with electricity is prioritized, and the charging controller 501 uses an amount of electric power equal to or below a value acquired by subtracting an amount of electric power for charging the high voltage battery B1 with electricity from an amount of electric power supplied from the external power supply E to charge the low voltage battery B2 with electricity. Note herein that charging of the low voltage battery B2 with electricity may be performed using electric power in the high voltage circuit 2 (electric power supplied from the high voltage battery B1) or electric power in the low voltage circuit 3 (electric power supplied from the on-vehicle charger 22).

As indicated by A2 illustrated in FIG. 5, the charging controller 501 uses a voltage higher than a charging voltage at which the high voltage battery B1 is undergoing charging with electricity to charge the low voltage battery B2 with electricity. Thereby, charging of the low voltage battery B2 with electricity is completed promptly.

The power supply system 1 according to the present embodiment offers effects described below. The power supply system 1 includes: the low voltage circuit 3 provided with the low voltage battery B2; the high voltage circuit 2 provided with the high voltage electric storage that is higher in voltage than the low voltage battery B2; the voltage converter 4 that couples the low voltage circuit 3 and the high voltage circuit 2 to each other; the on-vehicle charger 22 that supplies, when coupled to the external power supply E, direct current electric power to at least either of the high voltage circuit 2 or the low voltage circuit 3; the coupling state detector 23 that is able to detect that there is coupling between the external power supply E and the on-vehicle charger 22; the power switch 81 that receives an on operation or an off operation performed by the user for starting or stopping the vehicle V; and the charging controller 501 that causes the voltage converter 4 to operate to execute the auxiliary charging control for charging the low voltage battery B2 with electricity, in which, when a soak time representing a period of time elapsed after an off operation has been received is shorter than the first period of time that is determined beforehand, the coupling state detector 23 has detected that there is coupling between the external power supply E and the on-vehicle charger 22, and a remaining amount in the low voltage battery B2 is equal to or below the predetermined remaining amount, the charging controller 501 causes the low voltage battery B2 to be charged with electricity using electric power in the high voltage circuit 2 or electric power in the low voltage circuit 3.

Having such a configuration as described above allows the power supply system 1 to make it possible to secure a percentage of charge in the low voltage battery B2, even in a state where there is a higher possibility that the user does not perform preventive and predictive maintenance on the vehicle V, to securely start the vehicle V.

The coupling state detector 23 detects, based on mechanical coupling between the coupling terminal of the external power supply E and the on-vehicle charger 22 or based on an operation state at the coupling terminal of the external power supply E, whether or not there is coupling between the external power supply E and the on-vehicle charger 22. Having such a configuration as described above allows the power supply system 1 to make it possible to securely utilize, directly or indirectly, electric power supplied from the on-vehicle charger 22 when performing auxiliary charging.

Furthermore, when a soak time is shorter than the first period of time, and the coupling state detector 23 has detected that there is coupling between the external power supply E and the on-vehicle charger 22, the charging controller 501 causes the low voltage battery B2 to be charged with electricity in such a manner that a charging speed for the low voltage battery B2 is faster than a charging speed when the external power supply E is not coupled to the on-vehicle charger 22. Having such a configuration as described above allows the power supply system 1 to make it possible to use the external power supply E to promptly recover an amount of stored electric power in the low voltage battery B2.

Furthermore, when a soak time is shorter than the first period of time, the charging controller 501 uses an amount of electric power equal to or below a value acquired by subtracting an amount of electric power for charging the high voltage battery B1 with electricity from an amount of electric power supplied from the external power supply E to charge the low voltage battery B2 with electricity. Having such a configuration as described above allows the power supply system 1 to make it possible to execute auxiliary charging for the low voltage battery B2 without lowering a charging speed for the high voltage battery B1 when performing the auxiliary charging.

Furthermore, when a soak time is shorter than the first period of time, and the high voltage battery B1 is undergoing charging with electricity, the charging controller 501 does not cause the low voltage battery B2 to be charged with electricity. Having such a configuration as described above allows the power supply system 1 to make it possible to promptly charge the high voltage battery B1 with electricity.

Furthermore, when a soak time is shorter than the first period of time, the low voltage battery B2 is undergoing charging with electricity, and the coupling state detector 23 detects that there is release of the coupling between the external power supply E and the on-vehicle charger 22, the charging controller 501 stops charging of the low voltage battery B2 with electricity. Having such a configuration as described above allows the power supply system 1 to make it possible to improve workability for the user when the user performs preventive and predictive maintenance on the vehicle V.

Furthermore, after charging of the high voltage battery B1 with electricity is completed, the charging controller 501 causes the on-vehicle charger 22 to directly charge the low voltage battery B2 with electricity. Having such a configuration as described above allows the power supply system 1 to make it possible to use electric power supplied from the external power supply E to execute charging, making it possible to execute auxiliary charging for the low voltage battery B2 without consuming electric power in the high voltage battery B1.

Furthermore, after charging of the high voltage battery B1 with electricity is completed, and the coupling state detector 23 has detected that there is coupling between the external power supply E and the on-vehicle charger 22, the charging controller 501 causes the low voltage battery B2 to be charged with electricity at a voltage higher than a charging voltage at which the high voltage battery B1 undergoes charging with electricity. Having such a configuration as described above allows the power supply system 1 to make it possible to use a higher voltage for auxiliary charging, making it possible to promptly recover a starting-guaranteed percentage of charge in the low voltage battery B2.

Although the embodiment of the present invention has been described, the present invention is not limited to the embodiment. The details of the configuration may be appropriately altered within the scope of the present invention.

EXPLANATION OF REFERENCE NUMERALS

V Vehicle
1 Power supply system
2 High voltage circuit
B1 High voltage battery (high voltage electric storage)
3 Low voltage circuit B2 Low voltage battery (low voltage electric storage)
31 Vehicle auxiliary device
4 Voltage converter (charging circuit)
5 Electronic control unit group
50 Battery ECU
501 Charging controller
502 Auxiliary charging setter
503 RTC
71 Management ECU
72 BCM (operation receiver)
71 High voltage battery sensor
72 Low voltage battery sensor
81 Power switch (operation receiver)
82 Brake pedal (operation receiver)

What is claimed is:

1. A power supply system for a vehicle, comprising:
a low voltage circuit provided with a low voltage electric storage;
a high voltage circuit provided with a high voltage electric storage that is higher in voltage than the low voltage electric storage;
a charging circuit that couples the low voltage circuit and the high voltage circuit to each other;
an on-vehicle charger that supplies, when coupled to an external power supply, direct current electric power to at least either of the high voltage circuit or the low voltage circuit;
a coupling state detector that is able to detect that there is coupling between the external power supply and the on-vehicle charger;
an operation receiver that receives an on operation or an off operation performed by a user for starting or stopping the vehicle; and
a charging controller that causes the charging circuit to operate to execute auxiliary charging control for charging the low voltage electric storage with electricity,
wherein, when a soak time representing a period of time elapsed after the off operation has been received is shorter than a first period of time that is determined beforehand, the coupling state detector has detected that there is coupling between the external power supply and the on-vehicle charger, and a remaining amount in the low voltage electric storage is equal to or below a predetermined remaining amount, the charging controller causes the low voltage electric storage to be charged with electricity,
wherein the coupling state detector detects, based on mechanical coupling between a coupling terminal of the external power supply and the on-vehicle charger or based on an operation state at the coupling terminal of the external power supply, whether or not there is coupling between the external power supply and the on-vehicle charger, and
wherein, when the soak time is shorter than the first period of time and the coupling state detector has detected that there is coupling between the external power supply and the on-vehicle charger, the charging controller causes the low voltage electric storage to be charged with electricity in such a manner that a charging speed for the low voltage electric storage is faster than a charging speed for the low voltage electric storage when the external power supply is not coupled to the on-vehicle charger.

2. The power supply system for the vehicle, according to claim 1, wherein, when the soak time is shorter than the first period of time, the charging controller uses an amount of electric power equal to or below a value acquired by subtracting an amount of electric power for charging the high voltage electric storage with electricity from an amount of electric power supplied from the external power supply to charge the low voltage electric storage with electricity.

3. The power supply system for the vehicle, according to claim 1, wherein, when the soak time is shorter than the first period of time, and the high voltage electric storage is undergoing charging with electricity, the charging controller does not cause the low voltage electric storage to be charged with electricity.

4. The power supply system for the vehicle, according to claim 1, wherein, when the soak time is shorter than the first period of time, the low voltage electric storage is undergoing charging with electricity, and the coupling state detector detects that there is release of the coupling between the external power supply and the on-vehicle charger, the charging controller stops charging of the low voltage electric storage with electricity.

5. The power supply system for the vehicle, according to claim 1, wherein, after charging of the high voltage electric storage with electricity is completed, the charging controller causes the on-vehicle charger to directly charge the low voltage electric storage with electricity.

6. The power supply system for the vehicle, according to claim 1, wherein, after charging of the high voltage electric storage with electricity is completed, and the coupling state detector has detected that there is coupling between the external power supply and the on-vehicle charger, the charging controller causes the low voltage electric storage to be charged with electricity at a voltage for the low voltage electric storage higher than a charging voltage when the high voltage electric storage undergoes charging with electricity.

7. A control method performed in a power supply system for a vehicle, the control method comprising
causing, when a soak time representing a period of time elapsed after an off operation performed by a user for stopping the vehicle has been received is shorter than a first period of time that is determined beforehand, a coupling state detector in the power supply system has detected that there is coupling between an external power supply and an on-vehicle charger, and a remaining amount in a low voltage electric storage is equal to or below a predetermined remaining amount, a charging controller in the power supply system to charge the low voltage electric storage with electricity,
detecting, by a coupling state detector in the power supply system, based on mechanical coupling between a coupling terminal of the external power supply and the on-vehicle charger or based on an operation state at the coupling terminal of the external power supply, whether or not there is coupling between the external power supply and the on-vehicle charger, and
when the soak time is shorter than the first period of time, and the coupling state detector has detected that there is coupling between the external power supply and the on-vehicle charger, causing, by the charging controller, the low voltage electric storage to be charged with electricity in such a manner that a charging speed for the low voltage electric storage is faster than a charging speed for the low voltage electric storage when the external power supply is not coupled to the on-vehicle charger.

\* \* \* \* \*